April 27, 1926.
M. HORRELL
1,582,518
AGITATOR
Filed Dec. 18, 1922
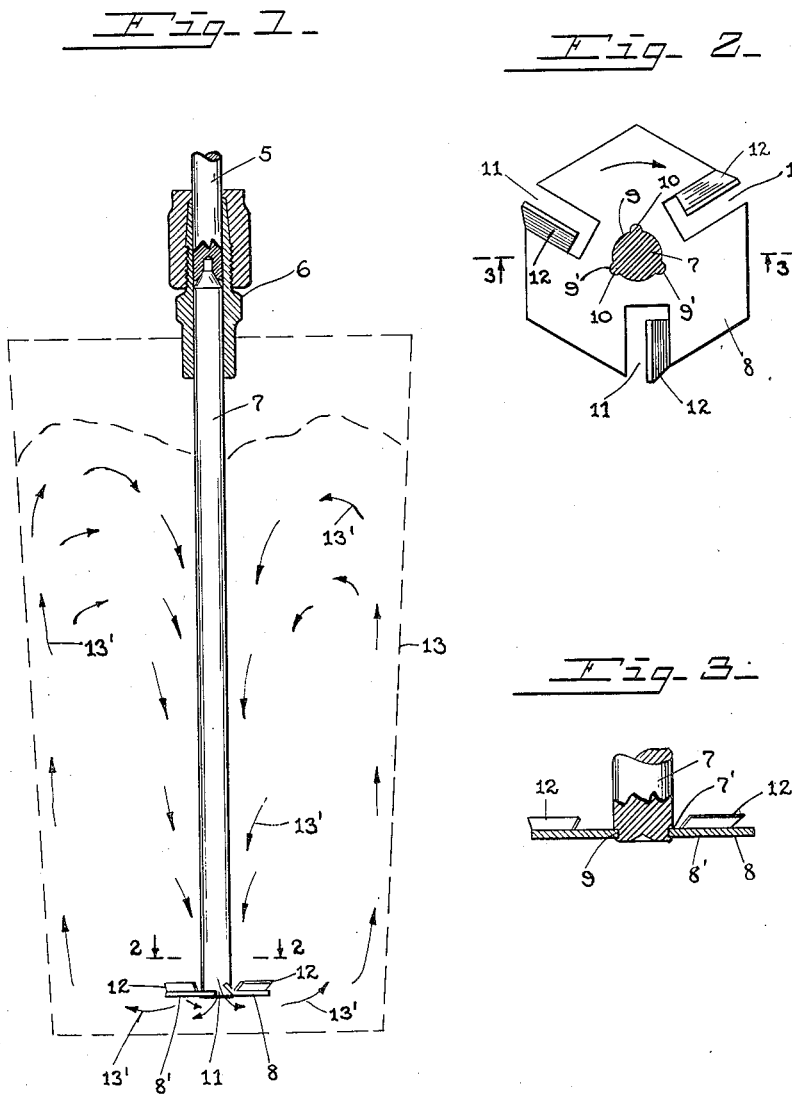
INVENTOR.
Martin Horrell
BY
Morsell + Keeney
ATTORNEYS.

Patented Apr. 27, 1926.

1,582,518

UNITED STATES PATENT OFFICE.

MARTIN HORRELL, OF RACINE, WISCONSIN, ASSIGNOR TO HAMILTON BEACH MFG. CO., OF RACINE, WISCONSIN, A CORPORATION OF WISCONSIN.

AGITATOR.

Application filed December 18, 1922. Serial No. 607,715.

*To all whom it may concern:*

Be it known that I, MARTIN HORRELL, a citizen of the United States, and resident of Racine, in the county of Racine and State of Wisconsin, have invented new and useful Improvements in Agitators, of which the following is a description, reference being had to the accompanying drawings, which are a part of this specification.

This invention relates to improvements in agitators, more particularly, although not solely, adapted for drink mixers.

It is one of the objects of the present invention to provide an agitator which will mix liquid, or powdered ingredients in liquid beverages quickly and efficiently together.

A further object of the invention is to provide an agitator constructed to draw the liquid downwardly through and close to the axis of the agitator and then discharge it centrifugally from beneath the agitator in a constant movement to thoroughly mix the contents of the receptacle in which the agitator is used.

A further object of the invention is to provide an agitator which may be formed of sheet metal in a very simple manner.

With the above and other objects in view, the invention consists of the improved agitator and its parts and combinations as set forth in the claims, and all equivalents thereof.

In the accompanying drawing in which the same reference characters indicate the same parts in all of the views:

Fig. 1 is a side view of a shaft, upon the lower end of which the improved agitator is mounted, the view indicating by dotted lines the flow of the ingredients while being mixed;

Fig. 2 is a sectional view taken on line 2—2 of Fig. 1 on a larger scale; and

Fig. 3 is a sectional view taken on line 3—3 of Fig. 2.

Referring to the drawing, the numeral 5 indicates a portion of a motor shaft which is provided with a coupling member 6 for connecting an agitator shaft 7 thereto. The lower end portion of the motor shaft is reduced in diameter to form a shoulder 7' and the improved agitator 8 is mounted on said reduced portion and bears against said shoulder. The agitator is formed of a sheet metal plate of hexagonal contour and the central opening 9 is provided with rounded notches 9' so that in riveting the end of the shaft over the plate, portions of the shaft will be forced into the recesses in the form of ribs 10 and firmly secure the plate thereon against independent movement. Each alternate corner of the plate is provided with an L-shaped cut 11 and the parts 12 formed by said cuts are flanged upwardly forwardly in the direction of rotation of the agitator as clearly shown in Figs. 2 and 3. The hexagonal contour of the agitator also adds to the mixing quality of the device as the edge corners all tend to agitate and stir the contents of the receptacle.

In operation the contents of the receptacle 13 will be drawn downwardly centrally of the receptacle, through the L-shaped cuts and then forced outwardly, centrifugally between the flat lower side 8' of the agitator and the bottom portion of the receptacle, and the side portions of the receptacle will then deflect the flow of liquid upwardly as indicated by the arrows 13' in a continuous circulation. As thus circulated, the contents of the receptacle will be completely mixed, and in mixing powdered ingredients with the liquid, the outward centrifugal flow of the liquid between the bottom of the receptacle and the agitator will prevent the settling of the powder in the bottom of the receptacle and thoroughly mix the same with the liquid.

From the foregoing description it will be seen that the agitator is of very simple construction and is well adapted for the purpose described.

What I claim as my invention is:

1. An agitator, consisting of a plate of flat material having L-shaped cut away portions extending inwardly from the edge thereof to form upturned and forwardly extending radial flanges of approximately the same width throughout their length which exert a tendency to draw the ingredients being mixed downwardly through the slots formed by the cut away portions towards the center portion of the plate and discharge them centrifugally therefrom, the rear edge portions of the plate formed by the cuts extending in a flat plane with the body portion.

2. The combination with a receptacle, of a rotatable shaft extending downwardly into said receptacle, and an agitator mounted on the lower end portion of said shaft and consisting of a flat hexagonally shaped plate of material having L-shaped cut away portions extending inwardly from the corner edges thereof, the inner parts of said cut away portions extending at right angles to other portions, the outer portions of the plate formed by the cuts being bent to form radial upturned and forwardly extending flanges of approximately the same width throughout their length which exert a tendency to draw the ingredients being mixed downwardly towards the center portion of the plate and discharge them centrifugally therefrom.

In testimony whereof, I affix my signature.

MARTIN HORRELL.